W. W. ELMER.
Process and Apparatus for the Manufacture of Salt.
No. 217,684. Patented July 22, 1879.
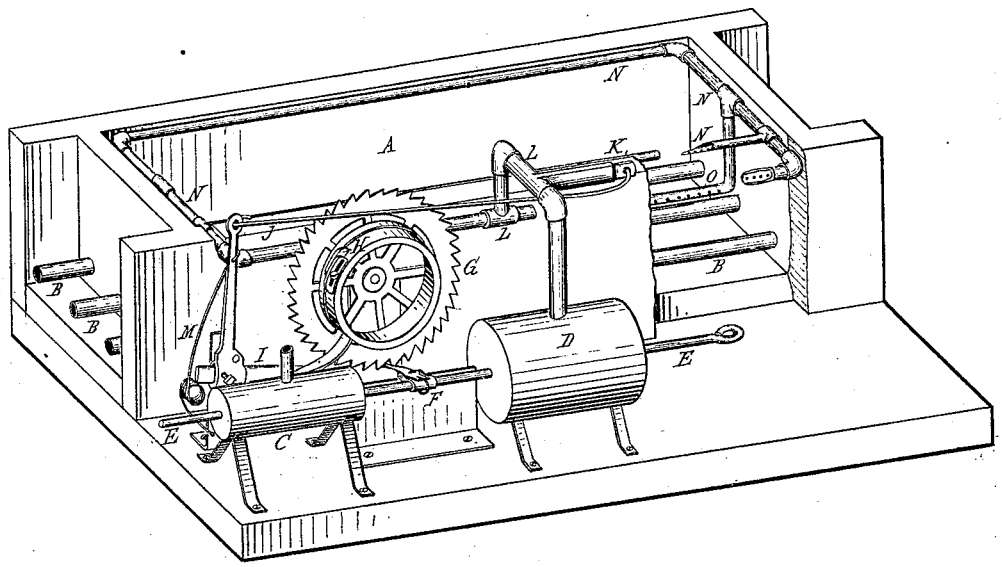
Attest:
A. Berthel
Charles J. Hunt
Inventor:
W. W. Elmer
By Atty
Thos. S. Sprague

UNITED STATES PATENT OFFICE.

WILLIAM W. ELMER, OF BAY CITY, MICHIGAN.

IMPROVEMENT IN PROCESSES AND APPARATUS FOR THE MANUFACTURE OF SALT.

Specification forming part of Letters Patent No. 217,684, dated July 22, 1879; application filed December 5, 1878.

*To all whom it may concern:*

Be it known that I, WILLIAM W. ELMER, of Bay City, Bay county, Michigan, have invented an Improvement in Process and Apparatus for the Manufacture of Salt from Liquid Brine, of which the following is a specification.

In the manufacture of salt from brine by the steam process, the brine is heated by steam-pipes in the bottom of the grainers to a temperature below the boiling-point. As the brine evaporates, the salt forms in very fine grains or crystals on the surface, and if allowed to remain there the grains will gradually increase in size by accretion until they become quite large, and sink of their own weight. To precipitate the grains of salt before they become too large for useful purposes, butter and other animal greases have been thrown upon the surface of the brine; but by this method the fineness of the salt cannot be certainly controlled, and the grains are not of uniform size, since the brine is continually circulating, on account of the unequal temperature which unavoidably occurs at the opposite ends of the grainer, and the butter or other grease following the currents is drawn away from some parts, leaving the surface of the brine clear. For economical purposes manufacturers have been in the habit of purchasing the cheap rancid butter and greases unfit for ordinary uses and applying them as above described. These greases floating upon the surface of the brine are absorbed by the crystals in their formation, rendering the salt to a certain extent unfit for human consumption.

The object of my invention, therefore, is to control with absolute certainty the size of the crystals desired, and to produce a pure salt by rendering it unnecessary to use impure or extraneous materials. This I accomplish by blowing upon the surface of the brine while undergoing the process of evaporation an intermittent blast of air at regular predetermined intervals, so as to agitate the brine and to precipitate the grains of salt when they have reached the desired proportions. It is not intended that these intermittent currents shall assist the process of evaporation, as this is done by heat applied in another way. It is desirable that the air should be of such a temperature as not to chill the surface of the brine, as this would retard the evaporation. The perforated pipes through which the currents are forced being exposed at all times to the heat arising from the brine, or immersed in the same, will warm the air sufficiently for the purpose, the air being of the temperature of the surrounding atmosphere when passing through the air-pump, or this air may be heated in any suitable manner before passing to the perforated pipes; or the air can be cooled, which cold air, although it would retard slightly the evaporation, would chill the crystals and increase their specific gravity, and thereby assist the precipitation.

The first formation of the crystals produces grains as fine as flour, and these, if allowed to rest upon the surface of the brine, enlarge and become, by additional formations attaching to them, larger in proportion to the time they are permitted to remain. Consequently a continuous disturbance of the surface by a continuous blast or current of air will precipitate these fine points as fast as formed, resulting in a salt so fine as to be useless, as it could not be handled, because it would absorb moisture from the brine before removal from the grainer, and from the atmosphere after removal, making the salt soggy or wet, and consequently with little or no marketable value. Therefore there must be an interval of time between the blasts, and the length of these intervals will regulate the fineness of the salt, the rapidity of the evaporation being taken into consideration. For instance, at the usual heat for evaporation by the steam process, the blasts should be about from one to one and a half minutes apart to produce a fine or table salt; for barrel or dairy salt, about two and a half minutes apart, and for packer's salt the intervals should be longer; but the necessary length of the intervals can be easily determined, and must depend, as before stated, somewhat upon the temperature of the brine and the rapidity of the evaporation.

While I prefer to direct the blast of air upon the surface of the brine, since a better effect is obtained, and the air-pipes, being above the brine, cannot have their openings clogged by the crystallization of the salt thereon, still I have also designed to charge the air intermittently into the brine, and to produce the agitation in that manner alone, or by the combined action of the surface-blasts and submerged pipes.

My invention consists in the process or method of controlling the crystallization of the brine to produce a uniform size of the grains of salt, consisting in agitating the brine by means of intermittent blasts of air; and, further, in the apparatus for carrying out this process, which apparatus will be now explained to enable others skilled in the art to practice and use my invention.

In the accompanying drawing, which forms a part of this specification, a pan or graining-vat provided with steam-pipes, both of the ordinary construction, is shown with a portion of the side broken out.

A represents the pan or graining-vat, and B the steam-pipes as usually employed. C is a steam-cylinder, and D an air-pump, and E a piston-rod passing through the steam and air cylinders, and giving like motion to pistons therein contained. Secured to the piston-rod between the two cylinders is a spring-pawl, F, which engages with the teeth of the ratchet-wheel G, and at each forward stroke of the piston-rod partially rotates said wheel. Said wheel is provided with a cam, H, rigidly secured thereto, which at each revolution of the ratchet-wheel engages with the pivoted bell-crank I, the other arm of which is pivoted to the connecting-rod J, which actuates a reciprocating valve, K, in the air-pipe L, which leads from the pump. Upon the further passage of the cam it is released from its engagement with the bell-crank, and the spring M retracts the other arm of the bell-crank and closes the valve. This air-pipe L, which is imperforated, connects with a series of branches, N, which are perforated in such manner as to discharge the air upon the surface of the brine in the pan or graining-vat. It may also be connected with another pipe, O, or a series of them, as may be desired, which are immersed in the brine and perforated to discharge the air, preferably laterally upon each side.

I do not desire to confine myself to the precise construction or means herein described for injecting and controlling the currents of air, as various mechanical devices may be employed whereby the air may be compressed and forcibly driven in intermittent currents with such intervals between them as may be desired by different manufacturers or required by differences in the quality and density of the brine.

I am aware that it has been proposed to agitate the brine intermittently by means of floats or bars floating upon or immersed in the brine and moved by hand at regular intervals of time, and thereby to attain the result which I produce; but this plan is impracticable for many reasons, among which are, first, these floats or bars become loaded with salt, which, becoming detached in large pieces, injures the commercial value of the article by destroying the uniformity of the crystals; second, the floats are in the way of the operators, who work in a steam-filled atmosphere of about 100° Fahrenheit over brine of about 190° Fahrenheit, and must work rapidly to remove the precipitated salt before it becomes saturated; third, as these floats act by scraping the surface, striking the crystals, and precipitating them by contact, such contact causes the crystals to stick together in some degree and to the floats; and, further, in a short time these floats would become so loaded as to make them clumsy and impossible of use to produce the desired result even in an imperfect way; and I am also aware that a continuous blast of heated air has been blown into brine and over the surface thereof to evaporate the brine; but the evaporation in my process is accomplished not by the blasts of air, but by heat applied otherwise, as by steam-pipes, my intermittent blast of air being used to precipitate the grains of salt and to control the granulation.

What I claim as my invention is—

1. The process or method of controlling the crystallization of brine, consisting in agitating the brine while being evaporated, and precipitation of the grains of salt at regular intervals by means of an intermittent blast of air forced into or upon the surface of the brine, substantially as described.

2. In combination with an evaporating-pan or graining-vat, an air-pump and a system of perforated air-pipes, said pump being provided with an imperforated communicating pipe, which is provided with a valve or valves connected with mechanism for intermittently controlling the passage of air, substantially as and for the purposes described.

W. W. ELMER.

Witnesses:
B. CHAPMAN,
F. L. WANDS.